(No Model.) 2 Sheets—Sheet 1.

W. J. PERKINS.
CRAMPING CHECK FOR VEHICLES.

No. 372,702. Patented Nov. 8, 1887.

Witnesses:
Tom R. Stuart

Inventor:
Willis J. Perkins,
By Emmarble
Atty.

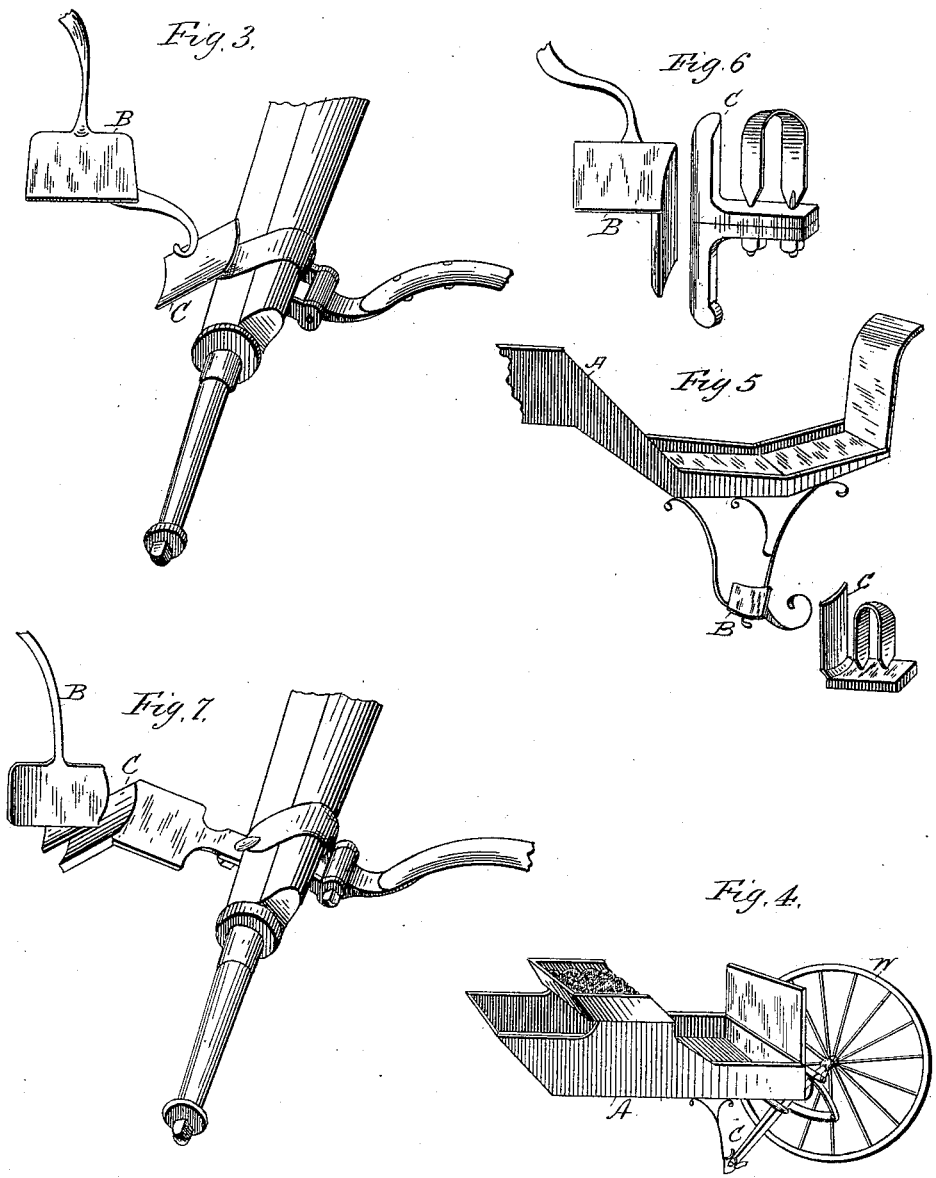

UNITED STATES PATENT OFFICE.

WILLIS J. PERKINS, OF GRAND RAPIDS, MICHIGAN.

CRAMPING-CHECK FOR VEHICLES.

SPECIFICATION forming part of Letters Patent No. 372,702, dated November 8, 1887.

Application filed October 4, 1886. Renewed September 5, 1887. Serial No. 248,904. (No model.)

*To all whom it may concern:*

Be it known that I, WILLIS J. PERKINS, a citizen of the United States, residing in the City of Grand Rapids, in the county of Kent and State of Michigan, have invented a new and useful Cramping-Check for Buggies and other Vehicles, of which the following is a specification.

My invention relates to a check consisting of an arm or stop, of metal or other suitable material, attached to the vehicle-body, side-rail, or to some part of the running-gear of the vehicle, adapted, when the vehicle is cramped, to come in contact with a corresponding check or stop connected with the front axle-tree of the vehicle; and the objects of my invention are, first, to prevent the front wheel of the vehicle, when cramped, from coming in contact with the vehicle-body or running-gear, thereby tending to upset the vehicle; second, to prevent the injury of robes and other articles, which frequently happens by such articles being caught between the vehicle-box or rub-iron and the wheel. These objects I accomplish by means of the mechanism illustrated in the accompanying drawings, in which—

Figure 1:
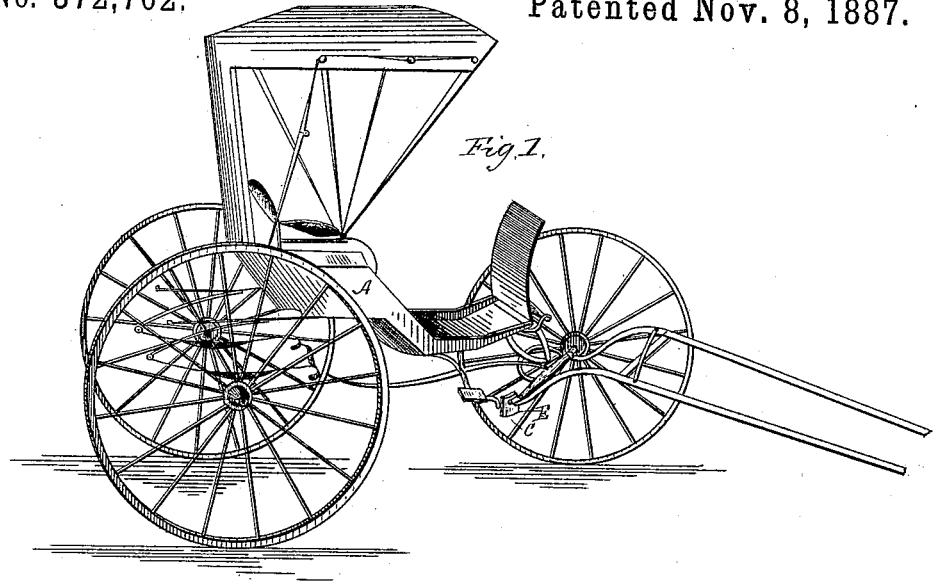
Figure 2:
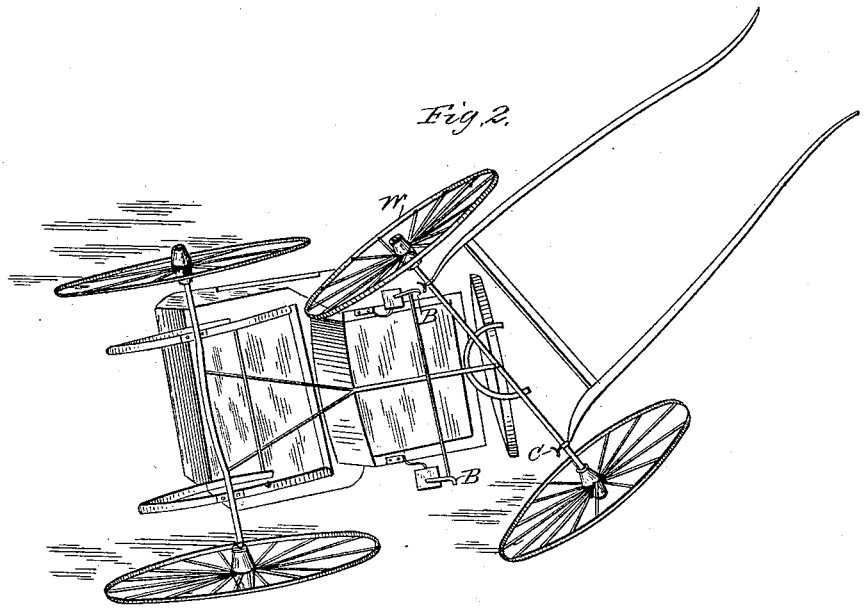

Figure 1 represents a phaeton-buggy cramped so as to bring my invention into operation, the front wheel and axle being removed. Fig. 2 represents an inverted plan view of a vehicle cramped in a similar shape. Fig. 3 represents an enlarged sectional view of the front axle-tree with one form of check or stop applied thereto. Fig. 4 shows one form of a check attached to the buggy-box or running-gear. Figs. 5, 6, and 7 show modified forms of checks or stops.

A represents the body of the vehicle.

E represents the front axle-tree of the vehicle.

W represents one of the front wheels of the vehicle.

C represents a stop or protection placed upon the front axle tree of the vehicle.

B represents a check-arm attached to the vehicle-body, or to some portion of the running-gear. This check-arm may be made of any suitable material, form, or shape, and may be attached, in the case of phaeton-buggies, directly to the buggy-box, or it may be attached to the side-rails or to any other portion of the running-gear. The stop C may be attached to the front axle-tree, as shown, and constructed as shown in Fig. 3, or it may be a simple band around the axle-tree or around the hub. It is evident that the form of these check-arms and stops is not material, the function of them being to check the cramping of the vehicle before the front wheel comes in contact with either the buggy-box or the running-gear.

Instead of attaching the stop C directly to the axle-tree, or to the hub of the front wheel, it might be attached to an extended portion of the shafts, said shafts being attached to the axle-tree.

A convenient way of attaching the check-arm to the body or running-gear of the vehicle is to attach it directly to the step, or make it a part of the step, as shown in Fig. 7, yet it may be attached in various other ways. In a buggy or vehicle constructed in accordance with my invention the cramping has very little tendency to upset the carriage, and the wheel can never come in contact with other portions of the vehicle, so as to cut and injure robes and other articles, as frequently happens in buggies and vehicles constructed in the ordinary manner.

I prefer to attach the stop C directly to the front axle tree, as I have found such attachment very satisfactory.

I do not confine myself to the particular form shown and described, as many modifications of the same may be made.

Having thus described my invention, what I claim to have invented, and desire to secure by Letters Patent, is—

1. In a buggy or other vehicle, a check-arm or stop, of suitable material, attached to and projecting outwardly from the side of the body or running-gear of a vehicle, in connection with a stop or check attached to or connected with the front axle-tree, said checks or stops being adapted to meet each other, when the vehicle is cramped, at such a point as will prevent the front wheels of the vehicle from coming in contact with the vehicle-body or running-gear, substantially as described.

2. In a buggy or other vehicle, the combination of a stop, C, attached to or integral with the front axle-tree, and a stop or check, B, secured to and extending outwardly from the body or attachments of the vehicle, substantially as described.

WILLIS J. PERKINS.

Witnesses:
FRED W. STEVENS,
EDWARD B. ESCOTT.